United States Patent
Olabiyi et al.

(10) Patent No.: US 11,615,255 B2
(45) Date of Patent: *Mar. 28, 2023

(54) MULTI-TURN DIALOGUE RESPONSE GENERATION WITH AUTOREGRESSIVE TRANSFORMER MODELS

(71) Applicant: Capital One Services, LLC, McLean, VA (US)

(72) Inventors: Oluwatobi Olabiyi, Arlington, VA (US); Erik T. Mueller, Chevy Chase, MD (US); Rui Zhang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/935,584

(22) Filed: Jul. 22, 2020

(65) Prior Publication Data
US 2021/0027022 A1 Jan. 28, 2021

Related U.S. Application Data

(60) Provisional application No. 62/877,076, filed on Jul. 22, 2019.

(51) Int. Cl.
*G10L 15/00* (2013.01)
*G06F 40/00* (2020.01)
(Continued)

(52) U.S. Cl.
CPC ........... *G06F 40/56* (2020.01); *G06F 40/284* (2020.01); *G06F 40/35* (2020.01); *G06K 9/6257* (2013.01);
(Continued)

(58) Field of Classification Search
CPC ...... G06N 20/00; G06N 3/049; G06N 3/0454; G06N 3/0481; G06N 3/08; G06F 40/56;
(Continued)

(56) References Cited

U.S. PATENT DOCUMENTS 6,721,706 B1 4/2004 Strubbe et al.
7,853,557 B2 12/2010 Schneider et al.
(Continued)

FOREIGN PATENT DOCUMENTS

CN 110046248 A 7/2019
CN 110083826 A 8/2019

OTHER PUBLICATIONS

Sordoni, Alessandro, et al. "A hierarchical recurrent encoder-decoder for generative context-aware query suggestion." proceedings of the 24th ACM international on conference on information and knowledge management. 2015.) (Year: 2015).*

(Continued)

*Primary Examiner* — Huyen X Vo
*Assistant Examiner* — Philip H Lam
(74) *Attorney, Agent, or Firm* — Banner & Witcoff, Ltd.

(57) ABSTRACT

Machine classifiers in accordance with embodiments of the invention capture long-term temporal dependencies in the dialogue data better than the existing RNN-based architectures. Additionally, machine classifiers may model the joint distribution of the context and response as opposed to the conditional distribution of the response given the context as employed in sequence-to-sequence frameworks. Machine classifiers in accordance with embodiments further append random paddings before and/or after the input data to reduce the syntactic redundancy in the input data, thereby improving the performance of the machine classifiers for a variety of dialogue-related tasks. The random padding of the input data may further provide regularization during the training
(Continued)

of the machine classifier and/or reduce exposure bias. In a variety of embodiments, the input data may be encoded based on subword tokenization.

20 Claims, 6 Drawing Sheets

(51) Int. Cl.
| | |
|---|---|
| G06F 40/56 | (2020.01) |
| G06F 40/35 | (2020.01) |
| G06N 3/049 | (2023.01) |
| G10L 15/22 | (2006.01) |
| G10L 15/06 | (2013.01) |
| G10L 15/16 | (2006.01) |
| G06N 20/00 | (2019.01) |
| G06K 9/62 | (2022.01) |
| G06F 40/284 | (2020.01) |

(52) U.S. Cl.
CPC .......... *G06K 9/6262* (2013.01); *G06N 3/049* (2013.01); *G06N 20/00* (2019.01); *G10L 15/063* (2013.01); *G10L 15/16* (2013.01); *G10L 15/22* (2013.01); *G10L 2015/0631* (2013.01); *G10L 2015/228* (2013.01)

(58) Field of Classification Search
CPC ........ G06F 40/284; G06F 40/35; G06F 40/30; G06K 9/6257; G06K 9/6262; G06K 9/627; G10L 15/063; G10L 15/16; G10L 15/22; G10L 2015/0631; G10L 2015/228
See application file for complete search history.

(56) References Cited

U.S. PATENT DOCUMENTS

| | | | |
|---|---|---|---|
| 10,332,513 | B1 | 6/2019 | D'Souza et al. |
| 10,664,527 | B1 | 5/2020 | Henderson et al. |
| 10,860,629 | B1 | 12/2020 | Gangadharaiah et al. |
| 10,872,299 | B2 | 12/2020 | Wayne et al. |
| 10,978,056 | B1 | 4/2021 | Challa et al. |
| 11,200,885 | B1 | 12/2021 | Mandal et al. |
| 2009/0150156 | A1 | 6/2009 | Kennewick et al. |
| 2011/0060587 | A1 | 3/2011 | Phillips et al. |
| 2012/0221860 | A1 | 8/2012 | Hoornaert et al. |
| 2014/0222436 | A1 | 8/2014 | Binder et al. |
| 2014/0358890 | A1 | 12/2014 | Chen et al. |
| 2018/0181673 | A1 | 6/2018 | Liu |
| 2018/0203852 | A1* | 7/2018 | Goyal ............... G06N 3/006 |
| 2018/0293462 | A1 | 10/2018 | Ambati et al. |
| 2019/0266236 | A1 | 8/2019 | Battach et al. |
| 2019/0341036 | A1 | 11/2019 | Zhang et al. |
| 2019/0385595 | A1 | 12/2019 | Wabgaonkar et al. |
| 2020/0125992 | A1 | 4/2020 | Agarwal et al. |
| 2020/0175374 | A1 | 6/2020 | Hestness et al. |
| 2020/0202887 | A1 | 6/2020 | Modi et al. |
| 2021/0056270 | A1 | 2/2021 | Farhan et al. |
| 2021/0232773 | A1 | 7/2021 | Wang et al. |

OTHER PUBLICATIONS

Radford, Alec, et al. "Improving language understanding by generative pre-training." (2018) (Year: 2018).*
Cheng et al, ("Long short-term memory-networks for machine reading." arXiv preprint arXiv:1601.06733 (2016). (Year: 2016).*
Serban, Iulian, et al. ("A hierarchical latent variable encoder-decoder model for generating dialogues." Proceedings of the AAAI Conference on Artificial Intelligence. vol. 31. No. 1. 2017.) (Year: 2017).*
Chen et al. ((May 2019). Sequential matching model for end-to-end multi-turn response selection. In ICASSP 2019-2019 IEEE International Conference on Acoustics, Speech and Signal Processing (ICASSP) (pp. 7350-7354). IEEE.) (Year: 2019).*
A. J. Pinheiro, J. M. Bezerra and D. R. Campelo, "Packet Padding for Improving Privacy in Consumer IoT," 2018 IEEE Symposium on Computers and Communications (ISCC), 2018, pp. 00925-00929, doi: 10.1109/ISCC.2018.8538744. (Year: 2018).*
Ilian V. Serban et al, A Hierarchical Latent Variable Encoder-Decoder Model for Generating Dialogues, arXiv:1605.06069v3 [cs.CL] Jun. 14, 2016.
Alec Radford et al, Language Models are Unsupervised Multitask Learners, OpenAI Blog 1.8, 2019.
Alec Radford et al, Improving Language Understanding by Generative Pre-Training, 2018.
Kishore Papineni et al, BLEU: a Method for Automatic Evaluation of Machine Translation, Proceedings of the 40th Annual Meeting of the Association for Computational Linguistics (ACL), Philadelphia, Jul. 2002, pp. 311-318.
Oluwatobi Olabiyi et al, Multi-turn Dialogue Response Generation in an Adversarial Learning Framework, arXiv:1805.11752v5 [cs.CL] Jun. 26, 2019.
Oluwatobi Olabiyi et al, An Adversarial Learning Framework For A Persona-Based Multi-Turn Dialogue Model, arXiv:1905.01992v2 [cs.CL] Jun. 26, 2019.
Oluwatobi O. Olabiyi et al, Adversarial Bootstrapping for Dialogue Model Training, arXiv:1909.00925v2 [cs.CL] Sep. 4, 2019.
Oluwatobi O. Olabiyi et al, A Persona-based Multi-turn Conversation Model in an Adversarial Learning Framework, arXiv:1905.01998v1 [cs.CL] Apr. 29, 2019.
Ryan Lowe et al, The Ubuntu Dialogue Corpus: A Large Dataset for Research in Unstructured Multi-Turn Dialogue Systems, arXiv:1506.08909v3 [cs.CL] Feb. 4, 2016.
Chin-Yew Lin, Rouge: A Package for Automatic Evaluation of Summaries, Association for Computational Linguistics, Jul. 2004.
Jiwei Li et al, Deep Reinforcement Learning for Dialogue Generation, arXiv:1606.01541v4 [cs.CL] Sep. 29, 2016.
Jiwei Li et al, Adversarial Learning for Neural Dialogue Generation, arXiv:1701.06547v5 [cs.CL] Sep. 24, 2017.
Jiwei Li et al, A Diversity-Promoting Objective Function for Neural Conversation Models, arXiv:1510.03055v3 [cs.CL] Jun. 10, 2016.
Mex Lamb et al, Professor Forcing: A New Algorithm for Training Recurrent Networks, arXiv:1610.09038v1 [stat.ML] Oct. 27, 2016.
Ilya Sutskever et al, Sequence to Sequence Learning with Neural Networks, arXiv:1409.3215v3 [cs.CL] Dec. 14, 2014.
Ari Holtzman et al, The Curious Case of Neural Text Degeneration, arXiv:1904.09751v1 [cs.CL] Apr. 22, 2019.
Jacob Devlin et al, Bert: Pre-training of Deep Bidirectional Transformers for Language Understanding, arXiv:1810.048052 [cs.CL] May 24, 2019.
Zihang Dai et al, Transformer-XL: Attentive Language Models Beyond a Fixed-Length Context, arXiv:1901.02860v3 [cs.LG] Jun. 2, 2019.
Saizheng Zhang et al, Personalizing Dialogue Agents: I have a dog, do you have pets too?, arXiv:1801.07243v5 [cs.AI] Sep. 25, 2018.
Yizhe Zhang et al, Generating Informative and Diverse Conversational Responses via Adversarial Information Maximization, arXiv:1809.05972v5 [cs.CL] Nov. 6, 2018.
Rowan Zellers et al, Defending Against Neural Fake News, arXiv:1905.12616v1 [cs.CL] May 29, 2019.
Zhilin Yang et al, XLNet: Generalized Autoregressive Pretraining for Language Understanding, arXiv:1906.08237v1 [cs.CL] Jun. 19, 2019.
Chen Xing et al, Hierarchical Recurrent Attention Network for Response Generation, arXiv:1701.07149v1 [cs.CL] Jan. 25, 2017.
Ronald J. Williams et al, A Learning Algorithm for Continually Running Fully Recurrent Neural Networks, Neural Computation, 1, pp. 270-280, 1989.
Oriol Vinyals, A Neural Conversational Model, arXiv:1506.05869v3 [cs.CL] Jul. 22, 2015.
Ashish Vaswani et al, Attention Is All You Need, arXiv:1706.03762v5 [cs.CL] Dec. 6, 2017.
Yu Sun et al, Ernie: Enhanced Representation through Knowledge Integration, arXiv:1904.09223v1 [cs.CL] Apr. 19, 2019.

(56) References Cited

OTHER PUBLICATIONS

Yu Sun et al, Ernie 2.0: A Continual Pre-Training Framework for Language Understanding, arXiv:1907.12412v1 [cs.CL] Jul. 29, 2019.

Iulian Vlad Serban et al, Multiresolution Recurrent Neural Networks: An Application to Dialogue Response Generation, arXiv:1606.00776v2 [cs.CL] Jun. 14, 2016.

Iulian V. Serban et al, Building End-To-End Dialogue Systems Using Generative Hierarchical Neural Network Models, arXiv:1507.048083 [cs.CL] Apr. 6, 2016.

Pawel Budzianowski et al, Hello, It's GPT-2—How Can I Help You? Towards the Use of Pretrained Language Models for Task-Oriented Dialogue Systems, arXiv:1907.05774v2 [cs.CL] Aug. 4, 2019.

Pawel Budzianowski et al, MultiWOZ—A Large-Scale Multi-Domain Wizard-of-Oz Dataset for Task-Oriented Dialogue Modelling, arXiv:1810.00278v3 [cs.CL] Apr. 20, 2020.

Whenhu Chen et al, Semantically Conditioned Dialog Response Generation via Hierarchical Disentangled Self-Attention, arXiv:1905.12866v3 [cs.CL] Jun. 9, 2019.

Donghoon Ham et al, End-to-End Neural Pipeline for Goal-Oriented Dialogue Systems Using gpt-2, Proceedings of the 58th Annual Meeting of the Association for Computational Linguistics, pp. 583-592, Jul. 5-10, 2020, © 2020 Association for Computational Linguistics.

Ehsan Hosseini-Asl et al, A Simple Language Model for Task-Oriented Dialogue, arXiv:2005.00796v3 [cs.CL] Jul. 7, 2020.

Young-Bum Kim et al, OneNet: Joint Domain, Intent, Slot Prediction for Spoken Language Understanding, arXiv:1801.05149v1 [cs.CL] Jan. 16, 2018.

Sungjin Lee et al, ConvLab: Multi-Domain End-to-End Dialog System Platform, arXiv:1904.08637v1 [cs.CL] Apr. 18, 2019.

Hwaran Lee et al, SUMBT: Slot-Utterance Matching for Universal and Scalable Belief Tracking, arXiv:1907.07421v1 [cs.CL] Jul. 17, 2019.

Shikib Mehri et al, Structured Fusion Networks for Dialog, arXiv:1907.10016v1 [cs.CL] Jul. 23, 2019.

Oluwatobi O. Olabiyi et al., DLGNet: A Transformer-based Model for Dialogue Response Generation, arXiv:1908.01841v2 [cs.CL] Sep. 4, 2019.

Jiahuan Pei et al, A Modular Task-oriented Dialogue System Using a Neural Mixture-of-Experts, arXiv:1907.05346v1 [cs.CL] Jul. 10, 2019.

Baolin Peng et al., SOLOIST: Few-shot task-oriented dialog with A Single Pre-trained Auto-regressive Model, arXiv:2005.05298V3 [cs.CL] Jun. 22, 2020.

Alec Radford et al, Language Models are Unsupervised Multitask Learners, https://d4mucfpksywv.cloudfront.net/better-languagemodels, 2019.

Osman Ramadan et al, Large-Scale Multi-Domain Belief Tracking with Knowledge Sharing, arXiv:1807.06517v1 [cs.CL]Jul. 17, 2018.

Tsung-Hsien Wen et al, Semantically Conditioned LSTM-based Natural Language Generation for Spoken Dialogue Systems, arXiv:1508.01745v2 [cs.CL] Aug. 26, 2015.

Jason Williams et al, The Dialog State Tracking Challenge, Proceedings of the SIGDIAL 2013 Conference, pp. 404-413, Metz, France, Aug. 22-24, 2013, ©2013 Association for Computational Linguistics.

Yizhe Zhang et al, DialoGPT: Large-Scale Generative Pre-training for Conversational Response Generation, arXiv:1911.00536v3 [cs.CL] May 2, 2020.

Tiancheng Zhao et al, Rethinking Action Spaces for Reinforcement Learning in End-to-end Dialog Agents with Latent Variable Models, acarXiv:1902.08858v2 [cs.CL] Apr. 15, 2019.

Wang, F., "Building high-performance distributed systems with synchronized clocks", 2019, Available from ProQuest Dissertations and Theses Professional. Retrieved from https://dialog.proquest.com/professional/docview/2467863602? accountid=131444 (Year: 2019).

\* cited by examiner

MULTI-TURN DIALOGUE RESPONSE GENERATION WITH AUTOREGRESSIVE TRANSFORMER MODELS

CROSS-REFERENCE TO RELATED APPLICATIONS

The instant application claims priority to U.S. Provisional Patent Application No. 62/877,076, titled "Multi-Turn Dialogue Response Generation with Autoregressive Transformer Models" and filed Jul. 22, 2019, the disclosure of which is hereby incorporated by reference in its entirety.

TECHNICAL FIELD

The present disclosure is generally related to the generation of automated responses to user input.

BACKGROUND

Computer generated responses to user input such as dialogue, images, and the like, are often limited in diversity and/or not particularly relevant to the user input. For example, computer generated responses to user input such as dialogue in conventional systems may include phrases such as "I don't know," "I'm sorry," and "I don't know what you are talking about," that are safe, limited in diversity, and not particularly relevant to the topic of the conversation.

While advances in machine learning, especially within deep neural networks, have enabled new capacity for machines to learn behavior from repository human behavioral data, existing neural network architecture and/or methodology continue to produce computer generated responses to user input that are limited in diversity and/or not particularly relevant to the topic of the input data. Aspects described herein may address these and other problems, and generally improve the quality and capabilities of machine classifiers trained to perform classification tasks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems described herein may use transformer-based machine classifiers to perform a variety of natural language understanding tasks including, but not limited to sentence classification, named entity recognition, sentence similarity, and question answering. The exceptional performance of transformer-based language models is due to their ability to capture long-term temporal dependencies in input sequences.

Machine classifiers in accordance with embodiments of the invention capture long-term temporal dependencies in the dialogue data better than the existing recurrent neural network-based architectures. Additionally, machine classifiers may model the joint distribution of the context and response as opposed to the conditional distribution of the response given the context as employed in sequence-to-sequence frameworks. Machine classifiers in accordance with embodiments further append random paddings before and/or after the input data to reduce the syntactic redundancy in the input data, thereby improving the performance of the machine classifiers for a variety of dialogue-related tasks. The random padding of the input data may further provide regularization during the training of the machine classifier and/or reduce exposure bias. In a variety of embodiments, the input data may be encoded based on subword tokenization.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
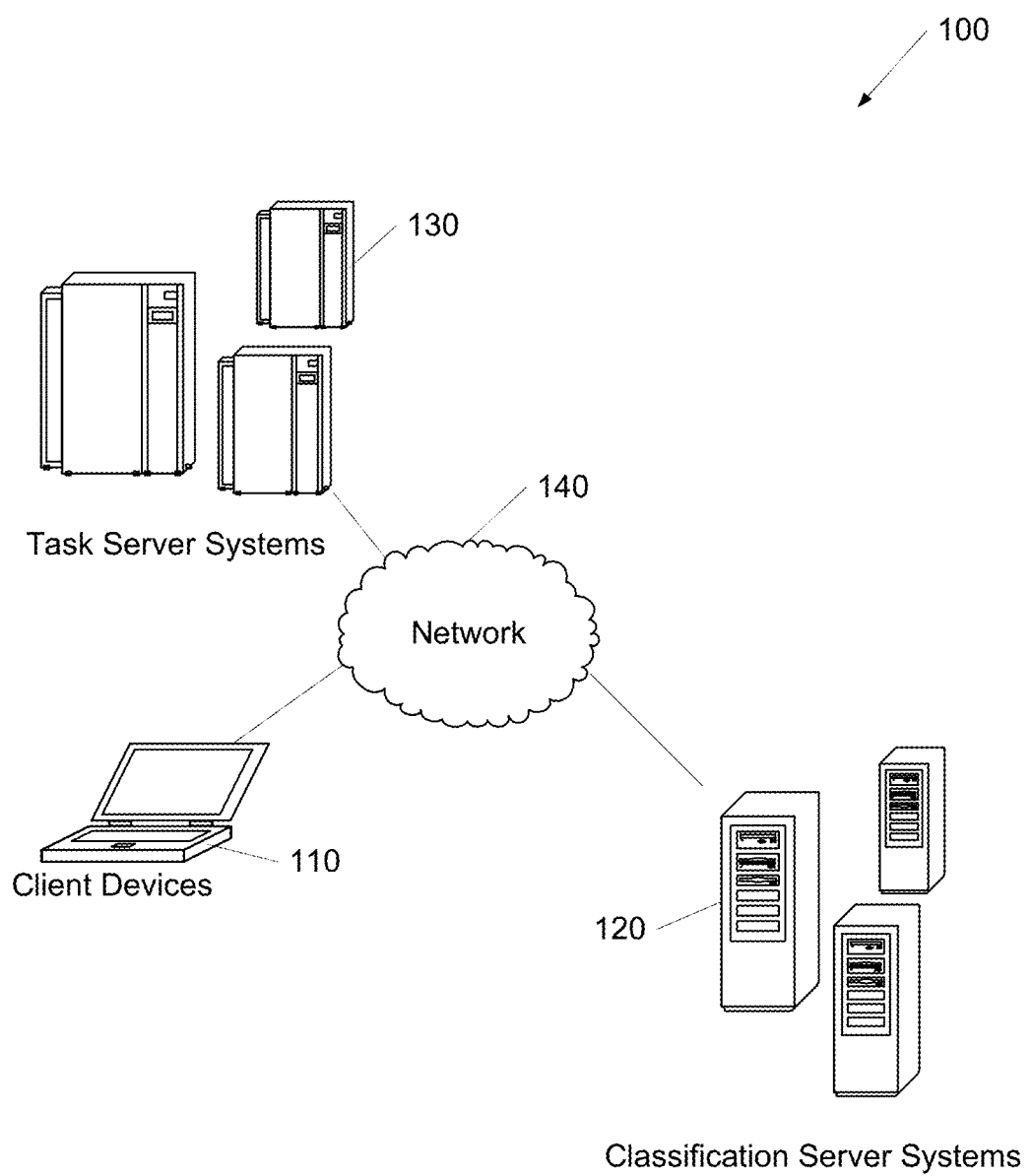
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for training machine classifiers to perform multiple tasks and generating responses. Conventional systems for generating responses in multi-turn dialogs often produce irrelevant or non-useful responses to user input due in part to the criterion for the training and application stages being different and generated responses tend to be either generic, out-of-context, or disproportionately short. A multi-turn dialog may include multiple conversation turns with a user providing an utterance and a response to that utterance. For example, conventional dialogue generation models may be trained with teacher forcing methods where, during training, the generator generates the next word in the response by taking the past word from an actual human response (e.g. past input) rather than the past output of the generator. However, during the application stage, the generator may produce irrelevant responses to the user input because it is only able to use its own past input. This discrepancy between training and inference is known as exposure bias and significantly limits the informativeness of the responses as the decoding error compounds rapidly during inference. To address exposure bias, conventional systems typically use a scheduled sampling technique where the machine learning module is encouraged to use its own past output word as the basis to generate new responses. However, this may easily lead to instabilities. Additionally, conventional systems may also produce responses to user input that are limited in diversity because diversity is often not encouraged during the training stage but expected during the application stage. To address diversity, conventional systems may apply heuristic techniques to the output of a machine learning module. However, this typically does not provide the same quality and quantity of diversity as introducing diversity during the training stage. Additionally, some conventional systems address diversity by using maximum mutual information criteria; however, this still provides limited diversity in generated outputs.

Human conversations contain a large number of generic, uninformative responses, giving rise to word-level syntactic and utterance-level semantic redundancy. The syntactic redundancy is evident from a nonuniform sequence entropy profile, that is concave with respect to token position, with the tokens at the beginning and end of a sequence having lower entropy than those in the middle. This initial positive energy gradient may create learning barriers leading to a poor calibration of the model's output distribution, and is a major contributing factor to the short, generic outputs in existing dialogue models. Earlier conversation models including single-turn sequence-to-sequence architectures typically fail to capture long-term temporal dependencies across conversation turns. Such models tend to fail in multi-turn scenarios, generating repetitive responses that are dull and generic. The use of multi-turn sequence-to-sequence models, such as the hierarchical recurrent encoder decoder architecture, tried to address this problem. The recurrent architecture, however, due to the gradient vanishing problem with backpropagation through time, limits the maximum number of turns and the number of word tokens in each turn that are used during training. One major and often overlooked limitation of existing dialogue models is the limitation of the input/output representation. The data preprocessing used in existing dialogue models includes word-level tokenization and lowercasing with less frequent (usually more informative) words mapped to an out-of-vocabulary token and thus restrict the space of the input and output texts that may be modeled. This is especially problematic for closed-domain datasets with lots of technical jargon, where preprocessing yields a large number of out-of-vocabulary tokens in both training and inference. Unfortunately, using character-level representations with complete coverage requires gradient backpropagation through a very long sequence, which is impractical for existing recurrent architectures. Existing dialogue models typically learn the conditional distribution of the response given the context (either single- or multi-turn), from the maximum likelihood estimation. Due to the redundant nature of dialogue data and the greedy nature of maximum likelihood estimation, the model usually learns just a simple mapping between the context and response, which yields generic responses. Alternative training frameworks that complement maximum likelihood estimation with other constraints, such as generative adversarial networks, reinforcement learning, and variational auto-encoders, focus on modifying the conditional response distribution to encourage diversity.

Machine classifiers in accordance with embodiments of the invention capture long-term temporal dependencies in the dialogue data better than the existing RNN-based architectures. Additionally, machine classifiers may model the joint distribution of the context and response as opposed to the conditional distribution of the response given the context as employed in sequence-to-sequence frameworks. Machine classifiers in accordance with embodiments further append random paddings before and/or after the input data to reduce the syntactic redundancy in the input data, thereby improving the performance of the machine classifiers for a variety of dialogue-related tasks. The random padding of the input data may further provide regularization during the training of the machine classifier and/or reduce exposure bias. In a variety of embodiments, the input data may be encoded based on subword tokenization. Accordingly, transformer-based machine classifiers may be trained to more accurately identify and generate relevant and interesting responses, saving processing time, processing resources, and improving the ability of a computing device to classify data.

Operating Environments and Computing Devices

FIG. 1 shows an operating environment 100. The operating environment 100 may include at least one client device 110, at least one task server system 130, and/or at least one classification server system 120 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may provide data and/or interact with a variety of machine classifiers as described herein. Classification server systems 120 may store, train, and/or provide a variety of machine classifiers as described herein. Task server systems 130 may exchange data with client devices 110, provide training data to the classification server systems 120, provide input data to the classification server systems 120 for classification, and/or obtain classified data from the classification server systems 120 as described herein. However, it should be noted that any computing device in the operating environment 100 may perform any of the processes and/or store any data as described herein. The task server systems 130 and/or classification server systems 120 may be publicly accessible and/or have restricted access. Access to a particular server system may be limited to particular client devices 110. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
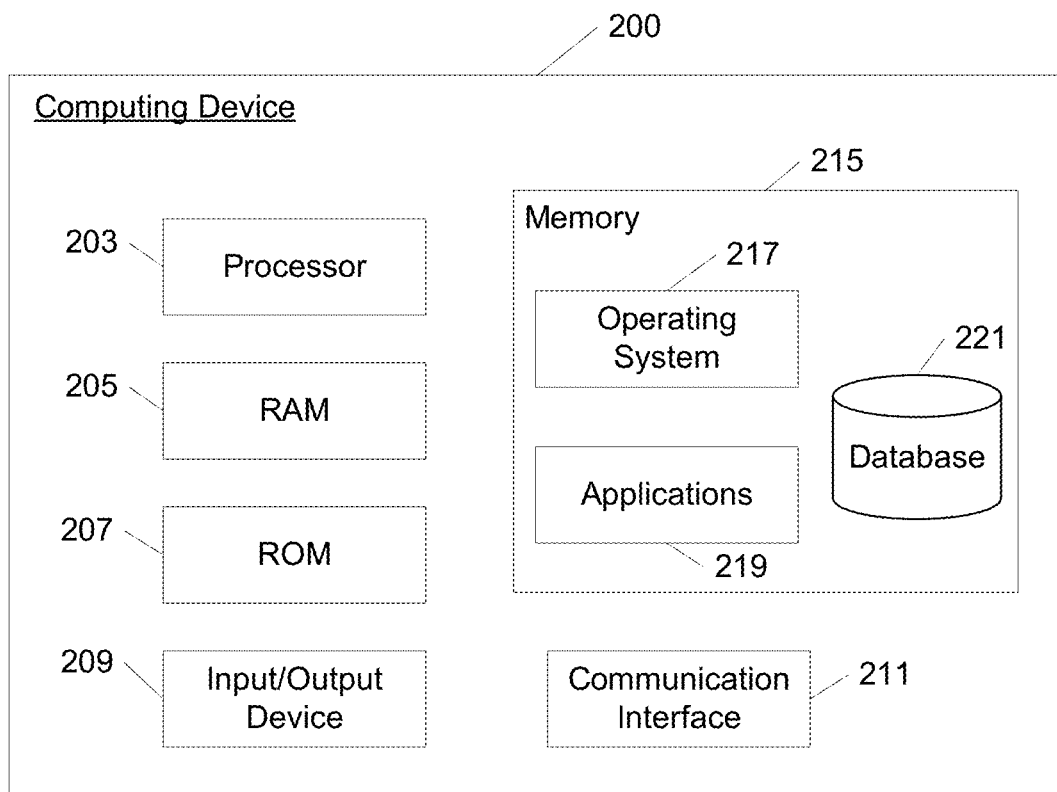
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Any data described and/or transmitted herein may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 200 in front of one or more computing devices such that any external devices may communicate directly with the specialized hardware.

Machine Classifiers and Processes

Figure 3:
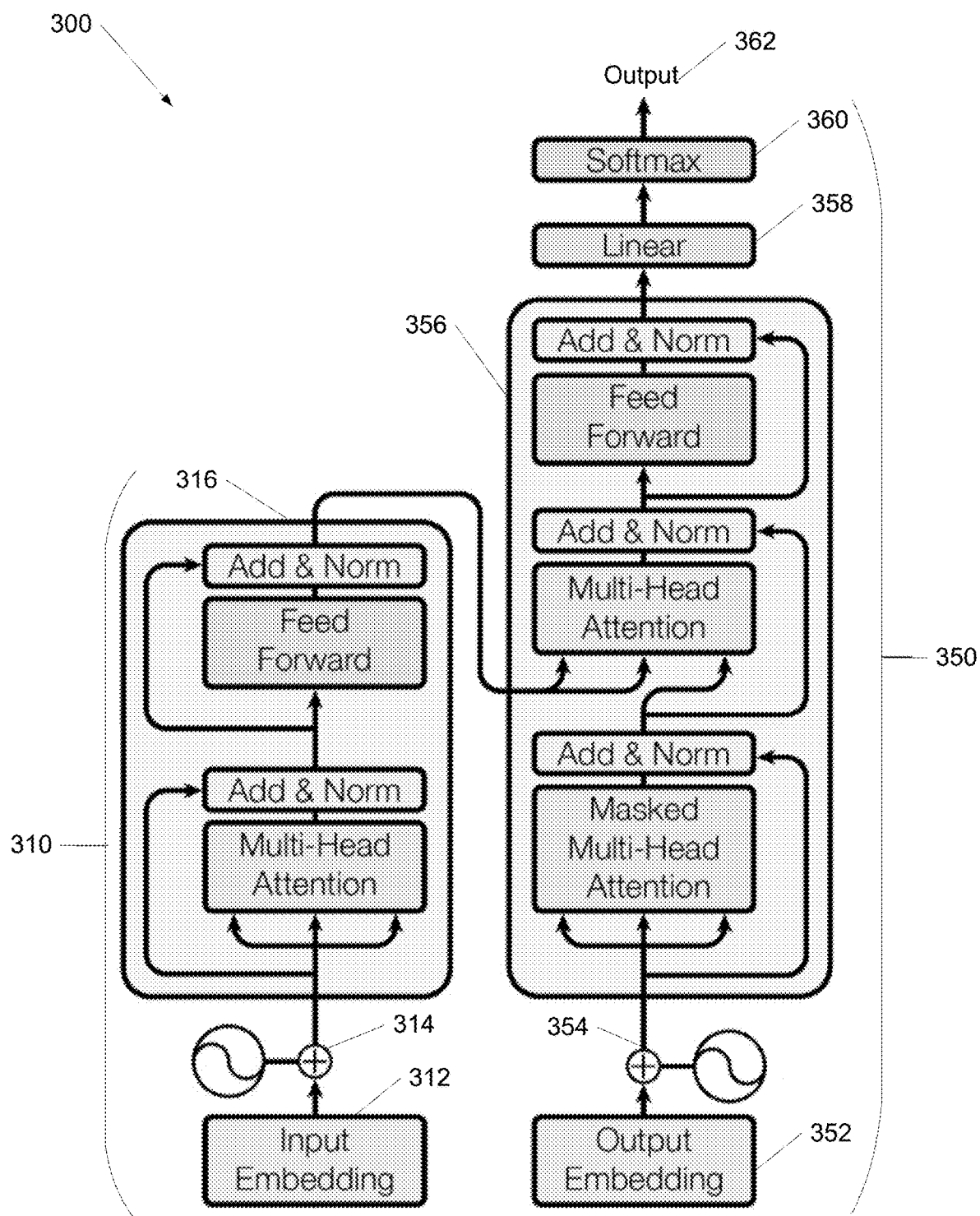
FIG. 3 shows an example of a machine classifier having a transformer architecture in accordance with one or more aspects described herein.

FIG. 3 shows an example of a machine classifier having a transformer architecture in accordance with one or more aspects described herein. The machine classifier 300 includes an encoder 310 and a decoder 350. In a variety of embodiments, the machine classifier 300 may use a sequence-to-sequence architecture that transforms a given input sequence, such as a sentence in a natural language processing task, into an output sequence. In several embodiments, the encoder and/or decoder use a long-short-term memory architecture, which may process the input sequence and/or output sequence while remembering (or forgetting) portions of the sequences that are important and/or unimportant. For example, sentences are typically sequence-dependent since the order of the words is crucial for understanding the meaning of the sentence. However, it should be noted that any machine classifier architectures may be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers may be utilized, more specific machine classifiers when available, and general machine classifiers at other times may further increase the accuracy of predictions.

The encoder 310 may take an input sequence 312 and generate an encoded input 314. The encoded input 314 may be a byte-pair encoding as described in more detail with respect to FIG. 5. The byte-pair encoding may include embedding a sequence into an n-dimensional space. The encoded input 314 may then be provided to an input attention layer 316 that processes the encoded input and provides the processed input data to the decoder 350. The decoder 350 may use an encoded output 354, generated based on a decoder input sequence 352, which is fed into an output attention layer 356 that generates one or more elements of an output sequence 362. In several embodiments, the encoding of the output sequence may include shifting the decoder input sequence one position. The generated elements may be processed, such as using a linear transformer 358 and/or SoftMax function 360 to add metadata, such as a confidence metric, to the generated elements of the output sequence 362. In a variety of embodiments, the decoder 350 generates the output sequence 362 on an element-by-element basis such that the input sequence 312 and decoder input sequence 352 are iteratively processed one element at a time.

An attention layer, such as input attention layer 316 and output attention layer 356, may analyze a sequence and determine one or more elements within the sequence that are important (or unimportant) to understanding the sequence. Analyzing the importance of a sequence may include determining the important elements previously seen in the sequence to provide context to the sequence. For example, when processing a sentence, an attention layer may identify elements within the sequence that provide grammatical semantics to understanding one or more concepts described by the sentence. In several embodiments, the attention layer may indicate the importance of an element by assigning a weight to a particular class of element based on its purpose within the sequence. Any weighting scheme, such as assigning a value between zero and one, or negative one and one, may be used as appropriate. The weighted elements provided by the attention layer may be provided to the decoder to assist the decoder in determining the output sequence based on the identified important elements within the input sequence. Similarly, unimportant elements may be ignored by the decoder so that the decoder avoids generating irrelevant or incorrect output based on the unimportant elements. In several embodiments, the encoder 310 and/or decoder 350 may contain multiple attention layers, 316 and 356 respectively. The attention layers may also include a feed-forward layer, such as a pointwise feed-forward layer. The feed-forward layer may include a feed-forward network with parameters for each position in a sequence. The parameters may be used to define a linear transformation of each element for the given sequence. In several embodiments, the parameters are the same for each element in the sequence.

The encoded sequences may include a variety of vector representations of the sequence being encoded. For example, an encoded sequence may include a vector representation of an element in the sequence, a vector representation of all the categories of elements in the sequence, and a vector representation of all the elements in the sequence. An attention mechanism may take vector representations of sequences and apply the appropriate attention weights to the vector representation of the elements based on the vector representation of the categories associated with the elements in the sequence. The attention mechanism may consider the encoder sequence and/or the decoder sequence as appropriate. In several embodiments, the attention weights are defined by how each element of the sequence, represented by the vector representation of the element in the sequence, is influenced by all the other elements in the sequence, represented by the vector representation of all the elements in the sequence. In several embodiments, a function, such as the SoftMax function, may be applied to the attention weights to distribute the attention weights between zero and one. Attention layers may include a variety of attention mechanisms, such as a scaled dot product attention mechanism and/or a multi-headed attention mechanism. Scaled dot product attention mechanisms may operate on a single element in a sequence at a time, while a multi-headed attention mechanism may operate on multiple elements in a sequence in parallel. Multi-headed attention mechanisms may also operate on different linear projections of the vector representations in parallel. A linear projection of a vector representation may be determined by multiplying the vector representation by a weight matrix learned during the training of the machine classifier. The weight matrices may be different depending on if the attention mechanism is being used by the encoder, the decoder, or both. An attention mechanism that connects the encoder and decoder may allow the encoder input sequence to be considered together with the current representation of the decoder input sequence during the generation of the output sequence.

Figure 4:
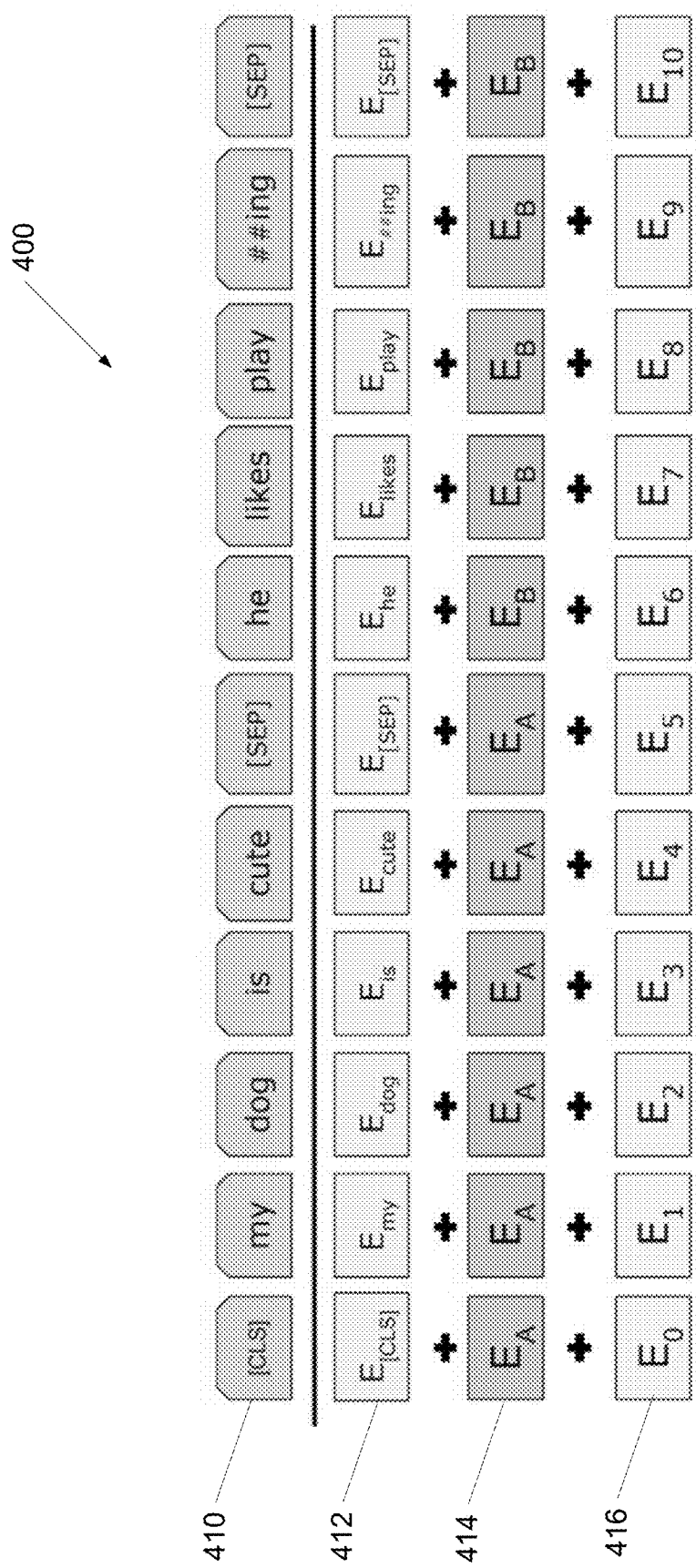
FIG. 4 shows an example of an encoding of input data in accordance with one or more aspects described herein.

FIG. 4 shows an example of encoding of input data in accordance with one or more aspects described herein. Encoded input data may include replacing multiple bytes of data with a byte that does not occur within the data. Any of a variety of encodings such as, but not limited to, byte pair encoding, WordPiece encoding, and subword tokenization may be used. Byte pair encoding is a form of data compression in which the most common set of consecutive bytes of data is replaced with a byte that does not occur within that data. A table of the replacement bytes is simultaneously generated such that the table may be used to reconstruct the original data from the compressed data by replacing the replacement bytes with the original bytes in reverse order of the original replacement. WordPiece encoding is a form of data compression in which commonly occurring subword pieces in a particular language are replaced with bytes not occurring within the language. The subword pieces may be determined based on the language and/or the words occurring within the data. The data may also be tokenized into subwords during the compression process. To perform subword tokenization, elements within the data may be broken into frequently occurring subwords. These subwords may then be substituted during the encoding of the data.

The encoded input data 400 includes an input sequence 410, token embeddings 412, segment embeddings 414, and position embeddings 416. In many embodiments, the encoding of the data is the sum of token embeddings 412, the segmentation embeddings 414, and the position embeddings 416. The input sequence 410 may include one or more tokens forming one or more subsequences within the input sequence 410. Each subsequence within the input sequence 410 may be related. For example, a first subsequence may be a statement and the second subsequence may be a response to that statement. The input sequence may begin with a start of sequence token, such as a [CLS] token as shown in encoded input data 400. The input sequence 410 may include multiple subsequences, such as multiple sentences in a dialog model, each subsequence being ended by a separator token. For example, a [SEP] token may be used to indicate the end of a subsequence in the input sequence 410. In several embodiments, a separator token not followed by another token may indicate the end of the input sequence 410. The tokens in the input sequence 410 may be stemmed, such as tokens "play" and "##ing" indicating that the input sequence 410 includes the word "playing" as shown in input sequence 410.

The token embeddings 412 may include an embedding for each token, including any separator tokens such as the start of sequence and separator tokens described herein, in the input sequence 410. The segmentation embeddings 414 may include an indication of, for each token in the input sequence 410, the subsequence in input sequence 410 to which the token belongs. For example, input sequence 410 includes two subsequences: subsequence A ("[CLS] my dog is cute [SEP]") and subsequence B ("he likes play ##ing [SEP]").

In segmentation embedding, those tokens associated with subsequence A are indicated by $E_A$ and those tokens associated with subsequence B are indicated by $E_B$. Position embeddings 416 may indicate the order in which each token appears in the input sequence 410. For example, input sequence 410 includes 11 tokens numbered $E_0$ to $E_{11}$.

A training example, such as an example for a multi-turn dialog, may include a sequence of N utterances $$x=(x_1,x_2,\ldots,x_N)$$

with utterance having a variable length $M_i$ word tokens $$x_i=(x_i^1,x_i^2,\ldots,x_i^{M_i})$$

such that, for vocabulary V, $$x_i^j \in V$$

And at any time step i, the dialogue history may be expressed as $$x_i=(x_1,x_2,\ldots,x_i)$$

A dialogue response generate task may include, for a dialog history $x_i$, a response $$y_i=(y_i^1,y_i^2,\ldots,y_i^{T_i})$$

may be generated, where $T_i$ is the number of generated tokens such that the distribution of the generated response $P(y_i)$ is substantially equivalent to (e.g. indistinguishable from) the ground truth $P(x_{i+i})$ and $T_i=M_{i+1}$. The distribution of the model output sequence may be factored by the product rule:

$$P(y_i \mid x_i) = \prod_{j=2}^{T_i} P\left(y_i^j \mid y_i^{1:j-1}, x_i\right)$$

where $$y_i^{1:j-1} = \left(y_i^1, \cdots, y_i^{j-1}\right)$$

The maximum likelihood estimation objective based on the conditional distribution of the model output sequence may be expressed as $$L_{Cond} = -\log P_\theta(y_i \mid x_i) = -\sum_{j=2}^{T_i} \log P_\theta\left(y_i^j \mid y_i^{1:j-1}, x_i\right)$$

where θ is the model parameters.

In order to address semantic redundancy, the context and response may be modeled jointly as an alternative to the mutual information objective. The resulting distribution and the objective function may then be respectively expressed as:

$$P(y_i,x_i)=P(y_i|x_i)P(x_i)$$

$$L_{joint}=-\log P_\theta(y_i|x_i)-\log P_\theta(x_i)$$

This addresses semantic redundancy in the input data. To address syntactic redundancy in the dialog data, random informative paddings may be added to encoder sequences used to train the encoder of the machine classifier. Informative paddings may include randomly selected paddings and/or paddings that add contextual information and/or metadata to the encoder sequence. In several embodiments, the informative paddings are sampled from the training data set. The informative paddings may be added before $x_i^b$ and/or after $x_i^a$ such that $$P(x_i^a, y_i, x_i, x_i^b) = P(x_i^a)P(y_i|x_i)P(x_i)P(x_i^b)$$

$$L_{DLGNet} = -\log P_\theta(x_i^a) - \log P_\theta(y_i|x_i) - \log P_\theta(x_i) - \log P_\theta(x_i^b)$$

$x_i^b$ and/or $x_i^a$ may be independent from $(y_i, x_i)$. Appending these random paddings may reduce adverse effects of syntactic redundancy in dialog data, resulting in the conditional distribution $P(y_i|x_i)$ being an inference on the joint distribution $P(x_i^a, y_i, x_i, x_i^b)$.

Machine classifiers in accordance with aspects of the application may utilize an autoregressive transformer architecture using only a decoder without the need for a separate encoder. Autoregressive transformer models may use multiple layers of masked multi-head self-attention to map a sequence of input tokens to a sequence of output tokens (i.e., the input sequence token shifted one position to the right). During inference, at each step, the machine classifier may be autoregressive, consuming the previously generated token as additional input when generating the next. There are some basic conceptual differences between autoregressive architectures based on transformers and those based on recurrent neural networks (RNNs). For instance, while the output of an RNN layer depends on only the immediate previous output, a transformer layer output consists of attention over all previous outputs. Due to this lack of ordering in transformer architectures, the position representation is usually passed along with the input tokens into the model. A variety of parameters, attention layers, and/or hidden state sizes may be used in a particular machine classifier. For example, a machine classifier may use 117 million parameters, 12 attention layers, and a hidden state size of 767 for a particular set of training examples for a first task. In a second example, a machine classifier may use 345 million parameters, 24 attention layers, and a hidden state size of 1024 for a different set of training examples for a second task. The machine classifiers may be trained using an adaptive moment estimation stochastic gradient descent with an arbitrary learning rate, such as 0.001. A variety of batch sizes and iterations may be used as appropriate.

Figure 5:
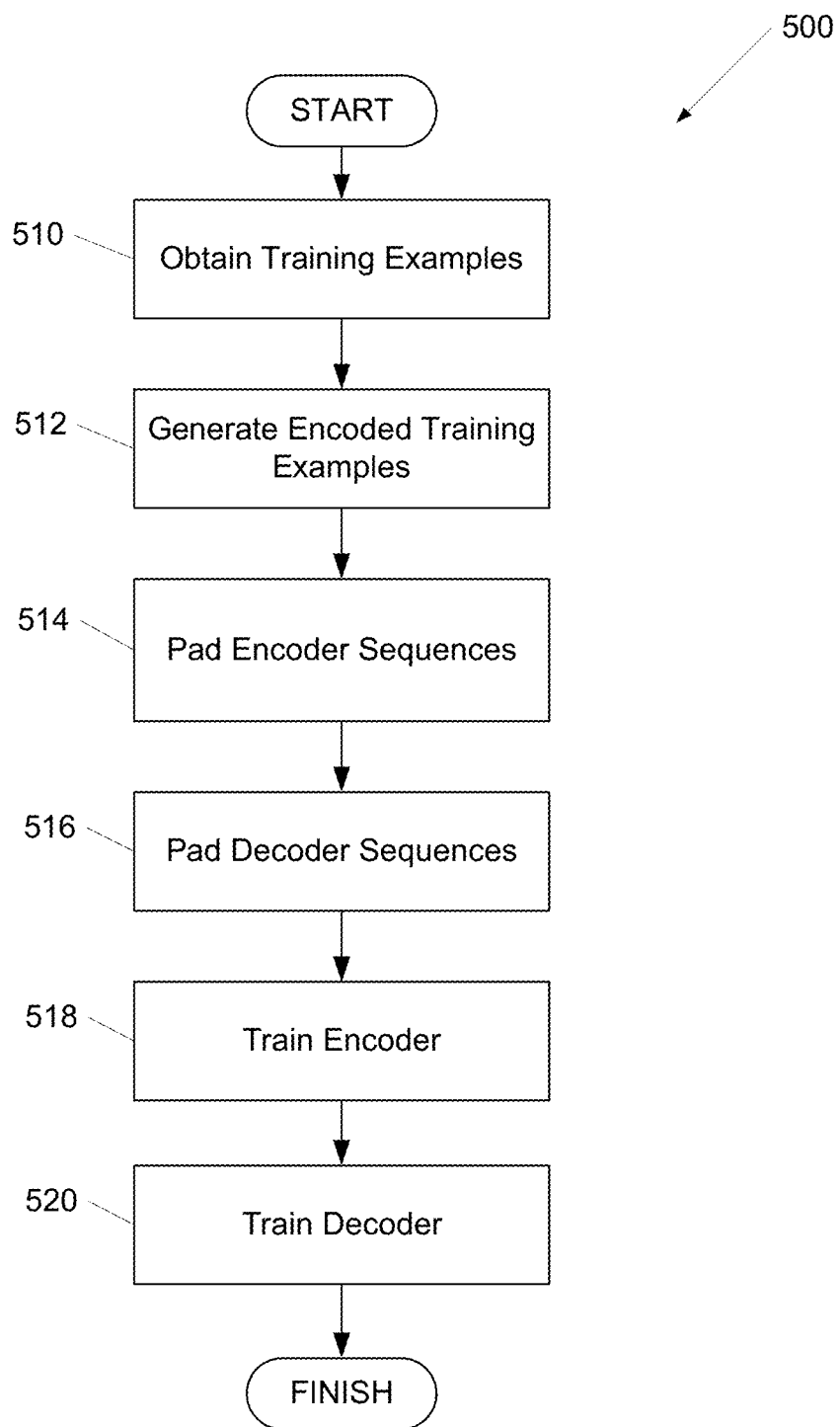
FIG. 5 shows a flow chart of a process for training a machine classifier according to one or more aspects of the disclosure.

FIG. 5 shows a flow chart of a process for training a machine classifier according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, training examples may be obtained. The training examples may include one or more input sequences. Each input sequence may be associated with a task. Each input sequence may include one or more subsequences. The subsequences may include encoder sequences and/or a decoder sequences that may be provided to an encoder and a decoder, respectively, of a machine classifier during a training process to train the machine classifier to classify data associated with the task. A machine classifier may be trained for the task represented by at least one input sequence in the training examples. An input sequence may include multiple subsequences as described herein.

At step 512, encoded training examples may be generated. Any of a variety of encodings, such as byte pair encodings, WordPiece encodings, subword tokenization, and any other encoding may be utilized as appropriate. Encodings may be generated for each input sequence within the training examples. The encodings may include a token embedding, a segmentation embedding, and a position embedding as described herein. An encoding of a training example may include an indication of a task associated with the input sequence used to generate the encoded training examples. In a variety of embodiments, a subset of the training examples are encoded. The subset of training examples can be randomly sampled from the training examples and/or selected based on particular characteristics of the training examples. For example, if the machine classifier is being trained to identify a particular feature in input data, the training examples having that particular feature may be included in the subset of training examples.

At step 514, the encoder sequences may be padded. The encoder sequences may be padded using any tokens, such as a random sampling of encoded tokens from the training examples. The tokens may be prepended, appended, and/or randomly inserted within the encoder sequences as appropriate. This may address syntactic redundancy in the training examples and improve the training of the machine classifier when learning human conversation tasks.

At step 516, decoder sequences may be padded. A decoder sequence may be a subsequence within an input sequence that is provided to the decoder portion of a machine learning classifier. An input sequence may include one or more subsequences that are associated with an output to an input subsequence. For example, an input sequence may include a first subsequence that indicates a question and a second subsequence that is a response to the first subsequence. In another example, the input sequence may include a third subsequence that is a response to the second subsequence. In this way, a particular subsequence may be an output subsequence and/or an input subsequence based on the context in which the subsequence is being analyzed. Similarly, the second subsequence may be provided to a decoder as a decoder sequence when the encoder is being trained using the first subsequence, while the second subsequence may be provided to the encoder as an encoder subsequence when the decoder is being trained using the third subsequence as a decoder sequence. Decoder sequences may be padded to shift the tokens in the decoder sequence one or more positions to the right of the corresponding tokens in the corresponding input sequence. Decoder sequences may be shifted to reduce the likelihood that the machine classifier will learn to copy a decoder sequence for a particular input sequence during training of the machine classifier. By padding the decoder sequence for a particular input subsequence (e.g. an encoder sequence that is provided to an encoder of a machine classifier during training), the decoder may learn to generate an output token for a particular input token provided to the encoder. The decoder may learn to predict the target word/character for position i having only seen the word/characters 1, . . . , i−1 in the decoder sequence. In several embodiments, the decoder sequence is padded using a start of sentence token. In a number of embodiments, an end-of-sentence token is appended to the decoder input sequence to mark the end of that sequence.

At step 518, an encoder may be trained. The encoder may be trained for a particular task by providing one or more encoder sequences to the encoder. In several embodiments, an encoder sequence is associated with a loss mask and the encoder ignores encoder sequences that have been masked for the particular task. Training the encoder may include determining a set of attention weights for the tokens within the encoder sequence and providing the encoder sequence and/or attention weights to a decoder. The decoder may be simultaneously trained to decode the input sequence.

At step 520, a decoder may be trained. The decoder may be trained by determining a set of attention weights for a decoder sequence corresponding to the encoder sequence provided to the encoder during the training of the encoder. The attention weights for the decoder sequence may be determined based on the encoder sequence, the decoder sequence, and/or the encoder attention weights as appropriate. In several embodiments, the decoder is provided with the correct decoder data using a teacher forcing process. In many embodiments, the decoder sequence is associated with a loss mask and the decoder ignores decoder sequences that have been masked for the particular task. The training of the encoder and decoder may continue for each input sequence in the training examples.

Although process 500 is described with respect to the joint training of the encoder and the decoder, it should be noted that a variety of embodiments of the invention separately train the encoder and the decoder. For example, many embodiments of the invention include only training the encoder using one or more encoded input sequences. A number of embodiments of the invention may include only training the decoder using one or more encoded decoder sequences. The decoder sequences may or may not be padded, particularly in those embodiments where only the decoder is being trained. In several embodiments, particularly those where the encoder and decoder are not being jointly trained, the encoder sequence may not be fed from the encoder to the decoder during the training process. That is, the decoder may be trained using a decoder sequence without a corresponding encoder sequence.

Figure 6:
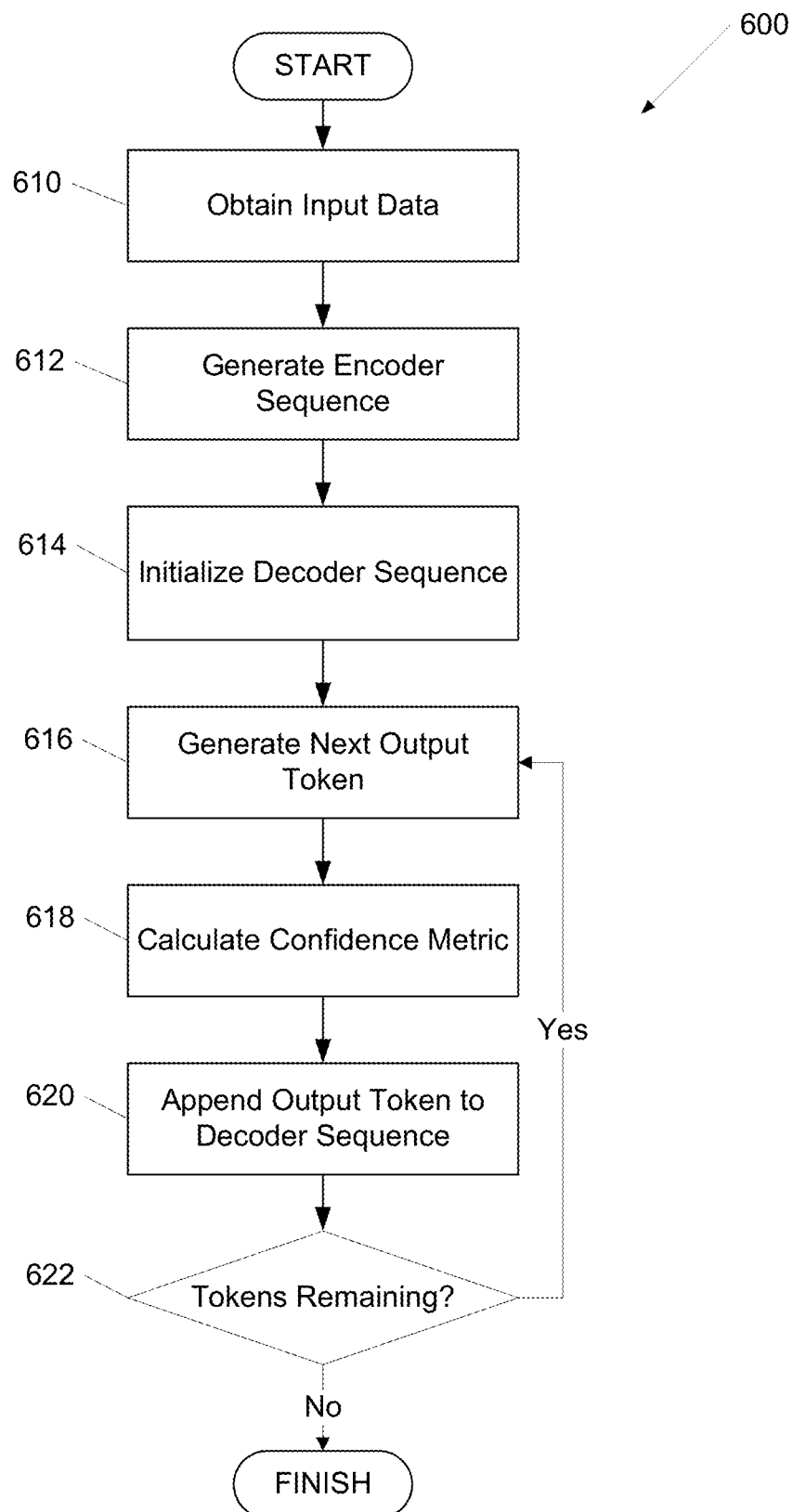
FIG. 6 shows a flow chart of a process for generating an output sequence according to one or more aspects of the disclosure.

FIG. 6 shows a flow chart of a process for generating an output sequence according to one or more aspects of the disclosure. Some or all of the steps of process 600 may be performed using one or more computing devices as described herein. In a variety of embodiments, some or all of the steps described below may be combined and/or divided into sub-steps as appropriate.

At step 610, input data may be obtained. The input data may include an input sequence for which a desired output is to be generated. The input data may include one or more subsequences and each subsequence may include one or more tokens as described herein.

At step 612, an encoder sequence may be generated. The encoder sequence may be generated by encoding the input data. The input data may be encoded into an encoder sequence using any of a variety of encodings as described herein. The encoding may include a token embedding, a segmentation embedding, and a position embedding as described herein.

At step 614, a decoder sequence may be initialized. The initial decoder sequence may include a start of sequence token. In several embodiments, the initial decoder sequence only includes a start of sequence token. However, the initial decoder sequence may include a variety of tokens as appropriate.

At step 616, a next output token may be generated. The next output token may be generated by providing the encoder sequence to the encoder of the machine classifier and the decoder sequence to the decoder of the machine classifier. The decoder may generate the next token for the output sequence based on the encoder sequence, the attention weights for the encoder sequence provided by the encoder, and the tokens currently present in the output sequence.

At step 618, a confidence metric may be calculated. The confidence metric may be calculated based on the likelihood that the decoder has generated a correct token based on the encoder sequence and/or the decoder sequence currently generated. The likelihood of correctness may be based on the training of the encoder and/or decoder as described herein. In a variety of embodiments, the attention weights associated with the encoder sequence and/or decoder sequence may be used to calculate the confidence metric.

At step 620, the next output token and associated confidence metric may be included in the decoder sequence. In many embodiments, the next output token is appended to the decoder sequence. However, the next output token may be placed anywhere in the decoder sequence as appropriate.

At step 622, the number of remaining tokens in the encoder sequence may be determined. When additional tokens are present in the encoder sequence, process 600 may return to step 616 for processing the next token present in the encoder sequence. When no more tokens remain in the encoder sequence, process 600 may finish. In several embodiments, the end of the encoder sequence may be indicated by an end of sequence token. In a variety of embodiments, when no more tokens are present in the encoder sequence, an end of sequence token is appended to the decoder sequence. The decoder sequence may be provided to a variety of systems as the output of the classification of the input data.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
    initializing a model having a sequence to sequence network architecture, wherein the sequence to sequence network architecture comprises:
        an encoder; and
        a decoder;
    training the model based on a training set comprising a plurality of training sequences, wherein each training sequence comprises an encoder sequence and a decoder sequence, and wherein training the model comprises:
        generating an encoding of each training sequence of the plurality of training sequences in the training set; and
        for each encoding:
            randomly inserting an informative padding, comprising a random sampling of encoded tokens from the training set, into the encoder sequence of the encoding;
            prepending a start of sequence token to the decoder sequence of the encoding;
            appending an end of sequence token to the decoder sequence of the encoding;
            training the encoder using the encoder sequence of the encoding; and
            training the decoder using the decoder sequence of the encoding; and
    generating, using the trained model, a prediction based on an input data set.

2. The computer-implemented method of claim 1, wherein each encoding comprises an attention weight for each token in the encoding, and
    wherein the attention weights are based on a feed-forward analysis using a position of each token in the encoding.

3. The computer-implemented method of claim 2, wherein training the encoder comprises updating the attention weight for at least one token in the encoder sequence of the encoding.

4. The computer-implemented method of claim 2, wherein training the decoder comprises updating the attention weight for at least one token in the decoder sequence of the encoding to an attention weight associated with at least one token in the encoder sequence of the encoding.

5. The computer-implemented method of claim 1, wherein an encoding of a sequence comprises a vector representation the sequence.

6. The computer-implemented method of claim 1, wherein generating the prediction comprises:
    generating an input encoding of the input data;
    generating an output sequence comprising:
        a start of output sequence token;
        one or more output sequence tokens generated by:
            generating a next output sequence token by providing the input encoding to the trained model; and
            appending the next output sequence token to the output sequence until the next output sequence token comprises an end of output sequence token; and
    generating the prediction based on the output sequence.

7. The computer-implemented method of claim 1, wherein encoder sequences of the plurality of training sequences comprise a set of dialog prompts.

8. The computer-implemented method of claim 1, wherein decoder sequences of the plurality of training sequences comprise a set of dialog responses.

9. The computer-implemented method of claim 1, wherein:
    the training set comprises a vocabulary; and
    an encoding for a sequence comprises one hundred percent coverage for the vocabulary.

10. The computer-implemented method of claim 1, wherein the model is configured to generate predictions regarding multi-turn dialogs.

11. A device, comprising:
    a processor; and
    a memory in communication with the processor and storing instructions that, when read by the processor, cause the device to:
        initialize a model having a sequence to sequence network architecture, wherein the sequence to sequence network architecture comprises:
            an encoder; and
            a decoder;
        train the model based on a training set comprising a plurality of training sequences, wherein each training sequence comprises an encoder sequence and a decoder sequence, and wherein training the model comprises:
            generating an encoding of each training sequence of the plurality of training sequences in the training set, wherein an encoding comprises an attention weight; and
            for each encoding:
                randomly inserting an informative padding, comprising a random sampling of encoded tokens from the training set, into the encoder sequence of the encoding;
                prepending a start of sequence token to the decoder sequence of the encoding;
                appending an end of sequence token to the decoder sequence of the encoding;
                training the encoder using the encoder sequence of the encoding, wherein the training the encoder comprises updating the attention weight for the encoder sequence; and
                training the decoder using the decoder sequence of the encoding; and
        generate, using the trained model, a prediction based on an input data set.

12. The device of claim 11, wherein training the decoder comprises updating the attention weight for at least one token in the decoder sequence of the encoding to an attention weight associated with at least one token in the encoder sequence of the encoding.

13. The device of claim 11, wherein an encoding of a sequence comprises a vector representation the sequence.

14. The device of claim 11, wherein the instructions, when read by the processor, further cause the device to generate the prediction by causing the device to:
    generate an input encoding of the input data;
    generate an output sequence comprising:
        a start of output sequence token;
        one or more output sequence tokens generated by:
            generating a next output sequence token by providing the input encoding to the trained model; and
            appending the next output sequence token to the output sequence until the next output sequence token comprises an end of output sequence token; and
    generate the prediction based on the output sequence.

15. The device of claim 11, wherein encoder sequences of the plurality of training sequences comprise a set of dialog prompts.

16. The device of claim 11, wherein decoder sequences of the plurality of training sequences comprise a set of dialog responses.

17. The device of claim 11, wherein:
the training set comprises a vocabulary; and
an encoding for a sequence comprises one hundred percent coverage for the vocabulary.

18. A computer-implemented method, comprising:
initializing a model having a sequence to sequence network architecture, wherein the sequence to sequence network architecture comprises:
an encoder; and
a decoder;
training the model based on a training set comprising a plurality of training sequences, wherein each training sequence comprises encoder sequence and a decoder sequence, and wherein training the model comprises:
generating an encoding of each training sequence of the plurality of training sequences in the training set, wherein an encoding comprises an attention weight;
for each encoding:
randomly inserting an informative padding, comprising a random sampling of encoded tokens from the training set, into the encoder sequence of encoding;
prepending a start of sequence token to the decoder sequence of the encoding;
appending an end of sequence token to the decoder sequence of the encoding; and
training the encoder using the encoder sequence of the encoding, wherein the training the encoder comprises updating the attention weight for the encoder sequence; and
training the decoder using the decoder sequence of the encoding;
obtaining input data;
generating an input encoding of the input data;
generating an output sequence comprising:
a start of output sequence token;
one or more output sequence tokens generated by:
generating a next output sequence token by providing the input encoding to the trained model; and
appending the next output sequence token to the output sequence until the next output sequence token comprises an end of output sequence token; and
generating a prediction based on the output sequence.

19. The computer-implemented method of claim 18, wherein encoder sequences of the plurality of training sequences comprise a set of dialog prompts.

20. The computer-implemented method of claim 18, wherein decoder sequences of the plurality of training sequences comprise a set of dialog responses.

* * * * *